United States Patent [19]
Alex et al.

[11] Patent Number: 5,254,641
[45] Date of Patent: Oct. 19, 1993

[54] POLYURETHANE FILMS AND THEIR USE FOR BONDING

[75] Inventors: Patrick Alex, Pecerse; Andre Piard, Bernay, both of France; Eduard de Jong, Troisdorf, Fed. Rep. of Germany

[73] Assignee: Elf Atochem Deutschland, GmbH, Bonn, Fed. Rep. of Germany

[21] Appl. No.: 925,512

[22] Filed: Aug. 5, 1992

[30] Foreign Application Priority Data

Jun. 8, 1991 [DE] Fed. Rep. of Germany ....... 4125957

[51] Int. Cl.$^5$ ............................................. C08L 75/04
[52] U.S. Cl. ................... 525/424; 525/440; 521/79; 521/137
[58] Field of Search ................ 525/424, 440; 521/79, 521/137

[56] References Cited

U.S. PATENT DOCUMENTS

4,857,569 8/1989 Cotts et al. .................... 525/424

Primary Examiner—Maurice J. Welsh
Attorney, Agent, or Firm—Schweitzer, Cornman & Gross

[57] ABSTRACT

Films of thermoplastic polyurethanes (TPU) with a Shore hardness of 75 A to 92 A having 5 to 20% by weight of polyether amide block copolymers and/or polyether ester block copolymers, and their use for adhering to other substrates, particularly for back-foaming with polyurethane foam. The invention also relates to the use of an addition of 5 to 20% by weight of polyether amide block copolymers and/or polyether ester block copolymers to thermoplastic polyurethanes with Shore hardnesses of 75 A to 92 A, based on the weight of the thermoplastic polyurethanes, for decreasing the adhesion and/or interlocking of thermoplastic polyurethanes produced by single layer blown extrusion technique.

9 Claims, No Drawings

POLYURETHANE FILMS AND THEIR USE FOR BONDING

FIELD OF THE INVENTION

The invention relates to films of thermoplastic polyurethanes (TPU) with addition of 5 to 20% by weight of polyether amide block copolymers and/or polyetherester block copolymers, based on the weight of the polyurethane.

BACKGROUND OF THE INVENTION

The unpublished European patent application 91400298 discloses a method for processing of extrusion mixtures based on TPU, which are characterized by the admixture of one or more modifiers selected from thermoplastic elastomers based on polyesters and/or polyamides (nylon). According to the examples of this application, there are no references to adhesive films, particularly to those which are back-foamed with polyurethane foam.

Pursuant to the known co-extrusion method (German Auslegeschrift 2114065, U.S. Pat. No. 3,880,891), elastomeric films, which contain no release agent or spacing agent and are therefore outstandingly suitable, for example, for back-foaming with polyurethane foam, can be produced from polyurethanes. The disadvantages of this method are that an expensive co-extrusion plant (two extruders and blowing head with two concentric, ring-shaped dies) must be used and that a separating film is obtained which is essentially a waste product.

On the other hand, the production of films from thermoplastic materials, such as polyurethanes, etc., by the single layer blown extrusion technique is known. For this method, a film bubble is blown by a ring-shaped die by means of an extruder. After it has cooled, this film bubble is collapsed and cut on both sides, so that two superimposed film sheets (flat films) result, which are then separated and rolled up.

For this method, an internal release agent or spacing agent must be added, no later than in the extruder, to the relatively strongly adhering thermoplastic synthetic materials before they are blown. Otherwise the sheets of film (flat films) adhere to one another when they collapse, so that they can no longer be wound up satisfactorily in two separate sheets of film.

At the very least, the danger exists that the wound up, separated sheets of film interlock during storage, since post-crystallization is unavoidable. The materials, which are used according to the state of the art for avoiding this adhesion or interlocking, are waxes and/or inorganic additives, such as those described, for example, in A) Kunststoff-Taschenbuch (Plastics Pocket Book) Saechtling, 24th edition, published by Hanser; B) Kunststoff-Handbuch (Plastics Handbook) 7, Polyurethanes, Becker/Braun; C) Kunststoffe (Plastics) 80 (1990) 7, pages 827 ff.; D) HOECHST Kunststoff-Additive Produktmerkblatt (Plastic Additives-Product Instruction Sheet), November, 1988; German Auslegeschrift 2429780, European patent 81-0195899. The addition of these materials, however, brings about a reduced adhesive force when used later as films that are to be back-foamed. The polyurethane foam which is foamed onto these films adheres inadequately to the supporting film.

The tendency of the films to adhere during manufacture and storage can also be decreased by increasing the hardness of the films. If, for example, polyurethane films, which are up to about 100 μm thick, have a Shore hardness of about 92 A or more, the production of the films is essentially problem-free. Even when back-foamed, the films still have sufficient adhesion towards the polyurethane foam. However, because of their high hardness, the films have an undesirably high stiffness and reduced elasticity, as well as a low water vapor permeability, which reduces the seat comfort or climate comfort of the back-foamed films when employed as seat cushions in upholstered furniture, such as automobile seats.

It is the object of the invention to avoid these disadvantages.

SUMMARY OF THE INVENTION

An object of the invention is achieved by the production of films of thermoplastic polyurethanes with a Shore hardness of 75 A to 92 A (DIN 53505), to which 5 to 20% by weight of polyether amide block copolymers and/or polyetherester block copolymers, based on the weight of the polyurethanes, have been added. Preferred are films which are obtained by the single layer blown extrusion technique method. Furthermore, these films preferably contain polyether amide block copolymers.

A further object of the invention is achieved by the improved production of TPU by the use of an addition of 5 to 20% by weight of polyether amide block copolymers and/or polyether ester block copolymers to the thermoplastic polyurethanes with Shore hardness of 75 A to 92 A, based on the weight of the thermoplastic urethanes, to reduce the adhesion and/or interlocking of monofilms produced from thermoplastic polyurethanes by the extrusion blow molding method. A further result of the invention is the successful use of the inventive films for enhanced adhesion to other substrates and/or back-foaming with polyurethane foams.

Using an addition of PEBA (polyether amide block copolymers) and/or polyether ester block copolymers an exceptionally surprising effect occurs in that, on the one hand, the tendency of films produced by the single layer blown extrusion process to adhere when collapsed or cut or while being wound up, even when these films have a low Shore hardness, is reduced to such an extent, that the films can be wound up and stored satisfactorily and, on the other, these films, while having a high elasticity and water permeability, have excellent adhesion, for example, to the back-foamed polyurethane foam.

As PEBA, within the meaning of the invention, polyether amide block copolymers of the German Auslegeschrift 2523991, U.S. Pat. No. 4,331,786, and German Auslegeschrift 2,856,787 can be used.

Above all, the polyether amide block copolymers can consist of polycondensates of homopolyamides or copolyamides having reactive end groups with homopolyethers or copolyethers with reactive end groups, such as:

a) homo- and/or copolyamides with amine chain ends with homo- or copolyoxyalkylenes with carboxyl chain ends, b) homo- or copolyamides with carboxyl chain ends with homo- or copolyoxyalkylenes with amine chain ends, c) homo- or copolyamides with carboxyl chain ends with homo- or copolyether diols, the so-called polyether ester amides, which are preferred particularly as modifiers for TPU.

The average molecular weight (number average) of these polyamides segments generally is between 500 and 10,000 and mostly between 600 and 5,000. The polyamides (nylons) are formed most frequently from nylon 6, 6.6, 6.12, 11, 12 or 12.12 and/or from amorphous nylon or from copolyamide, which results from the copolymerization of their monomers. Nylon (polyamide) 11, 12 and/or 12.12 are particularly preferred.

The average molecular weight (number average) of the polyether segments generally is between 200 and 6,000 and mostly between 600 and 3,000.

The polyethers mostly consist essentially of polytetramethylene glycol (PTMG). Aside from PTMG, they may contain polyethylene glycol (PEG) and/or polypropylene glycol (PPG). Polytetramethylene glycol (PTMG) and polyethylene glycol (PEG) are particularly preferred.

The inherent viscosity of the polyether amide block copolymers advisably is between 0.8 and 2.05. It is measured in meta-cresol at 20° C. with an initial concentration of 0.5 g of polymer in 100 g of meta-cresol.

The polyether amide block copolymers can be formed from 5 to 85% by weight of polyether and 95 to 15% by weight of polyamides. The most appropriate ratio is 30 to 85% by weight of polyether to 70 to 15% by weight of polyamide. The preferred polyether amide block copolymers are those the polyether of which consist essentially of PTMG and/or PEG and, above all those, the polyamides of which are condensates of nylons 11, 12 and/or 12.12.

The amount of PEBA added to the TPU (thermoplastic polyurethane) preferably is at least 8% by weight and particularly at least 10% by weight. The upper limit preferably is at 15% by weight. In this connection, the percentage by weight is based on the weight of the thermoplastic polyurethane.

Polyether ester block copolymers are condensation products of aromatic dicarboxylic acids, low molecular weight polyoxyalkylene glycols and short-chain diols with a segmented structure. They suitably consist of a hard, crystalline segment, which is formed from short-chain diols (butene diol, diethylene glycol) and dicarboxylic acids, preferably aromatic dicarboxylic acids, such as terephthalic acid, and a soft segment of polyoxyethylene glycols, such as those described above in connection with the polyether amide block copolymers. The molecular weights (number average) of the hard segments generally are between 500 and 10,000 and preferably between 600 and 5,000. The molecular weights (number average) of the soft segments advisably are between 200 and 6,000 and preferably between 600 and 3,000.

The inherent viscosity of the polyether ester block copolymers is suitably between 0.6 and 2.0. It is measured in meta-cresol at 20° C. with an initial concentration of 0.5 g of polymer in 100 g of meta-cresol.

TPU, within the meaning of the invention, includes the thermoplastic polyurethanes disclosed in the European patent B1-0158086, the German Auslegeschrift 2817457, the German Auslegeschrift 2817456, the European publication 0311278, the German Auslegeschrift 2429790 or the Kunststoff-Taschenbuch (Plastics Pocket Book) Saechtling, 24th edition, published by Hanser, can be used. The thermoplastic polyurethanes or TPU are synthesized by the reaction of a diisocyanate, such as di(p-isocyanatophenyl)-methane with an aliphatic, polymeric polyol, which has a molecular weight or more than 600 and is based, for example, on a polyester diol or a polyether diol, such as polypropylene glycol, polyethylene adipate, polytetramethylene adipate or ethylene adipate/tetramethylene adipate copolyester and chain extension of the reaction product with a diol having a molecular weight of less than 250, such as 1,4-dihydroxybutane.

The Shore hardness is suitably not more than approximately 90 A. The lower limit of the Shore hardness suitably is approximately 80 A. The invention may be practiced with Shore hardness of 75 A to 92 A.

For back foaming, the foam-forming products which are customary in the art are used. These are the so-called two-component polyurethanes, such as those described in the Kunststoff-Taschenbuch (Plastics Pocket Book) Saechtling, 24th edition, published by Hanser or in the Kunststoff-Handbuch (Plastics Handbook) 7, Polyurethanes, Becker/Braun. As mentioned initially, such back-foamings are carried out on a larger, industrial scale.

The upper limit of the thickness of the films, produced pursuant to the invention, is suitably at about 100 $\mu$m, preferably at about 80 $\mu$m and particularly at about 60 $\mu$m. Preferably, the films are as thin as possible in order to save material. On the other hand, they must have the required strength properties and other properties.

The same criteria also apply to the lower limit of the thickness of the films. Suitably, this is not less than 20 $\mu$m and, preferably, not less than 25 $\mu$m.

EXAMPLES:

The compositions, described in the following Tables, were extruded on single layer blown extrusion line and tested for their film properties.

| Extrusion Line Configuration: | |
| --- | --- |
| Drier: | Conventional, commercial, continuous SOMOS ® air drier |
| Metering station: | Volumetric metering station for metering additives continuously |
| Extruder: | Conventional, commercial, 150 mm blown film extrusion line; 3-zone screw with 1:2.4 compression with feeding zone, compression zone, metering zone and mixing elements; 10.5 mm flight depth of feeding zone; 4.3 mm flight depth of metering zone; 1 × 100, 2 × 400, 1 × 900 mesh/cm$^2$ screen pack. |
| Die: | Single layer film die in supporting ring construction, 700 mm diameter |
| Cooling: | Air ring with aerodynamic with air compensation for cooling film bubble |
| Collapsing: | To flatten the bubbles |
| Take off: | Pinch-off rollers with silicone rubber coating for flattening film bubble |
| Cutting station: | Bilateral edge cut of flattened film bubble |
| Winder: | Tandem winder |

EXAMPLE 1

The thermoplastic polyurethane TPU 1 was dried continuously in a Somos drier for 7 hours to a residual moisture content of 0.01% and mixed with a conventional, commercial polyether amide block copolymer (PEBA 40) having a residual moisture content of 0.06% in the mixing ratio given in the Table and supplied to a storage tank of the extrusion installation.

The temperature of the extruder and the die were adjusted to 200° C. The mixture was extruded with the screw revolving at 18 rpm. The pressure in front of the screen was 340 bar and behind the screen 270 bar. The temperature of the composition, measured in the neck between the screen and the die, was 205° C. The molten tube, emerging from the orifice, was blown to a diameter of approximately 1,000 mm and, after about 10 m, flattened by means of pinch-off rollers and guided over deflector rolls to an interim take-off. The edges were cut open at that point and the two sheets of film were separated and wound on tandem winders at a wind-up tension of 2.7 kg on a 1,500 mm paperboard core. There were no adhesion problems at the squeeze-off rollers. The release forces after the cutting were so slight, that problem-free separating and winding-up were readily effected.

The interlocking force, the release force, the film thickness, the ultimate tensile strength, the elongation at break, the tension at 100% extension, the resistance to tear propagation and the back-foamability were tested.

Examples 2 to 6 were carried out in an analogous manner with the parameters given in the Tables.

COMPARISON EXAMPLES 1 to 4

The compositions given in the Table were extruded and tested as described above

Explanations for the Tables

1) TPU Used

A) TPU 1:
Linear ester urethane, Shore hardness about 85 A, partially crystalline, free of lubricant, highly viscous, melt index, measured by a method based on DIN 53735 under a load of 211N at a temperature of 190° C., of 4 g per 10 minutes.
Chemical basis: di(p-isocyanatophenyl)methane; butane diol adipate, molecular weight (number average) about 2,000; butane diol as chain extender.

B) TPU 2
Linear ether urethane, Shore hardness of about 85, partially crystalline, free of lubricant, highly viscous, melt index, measured by a method based on DIN 53735 under a load of 211N at a temperature of 190° C., of about 12 g per 10 minutes.
Chemical basis: di(p-isocyanatophenyl)methane; polytetramethylene glycol, molecular weight (number average) about 1,000; butane diol as chain extender.

2) PEBA used

A) PEBA 40:
Conventional, commercial polyether amide block copolymer based on polyamide 12 and polytetramethylene glycol, Shore hardness of 40 D.

B) PEBA 55:
Conventional commercial copolyether amide block copolymer based on nylon 12 and polytetramethylene glycol, Shore hardness 55 D.

3) Additives

A) Calcium stearate
B) Waxes (ethylene bistearamide)

4) Foaming Test

The test provides information as to whether the film is back-foamable. The foam adhesion is measured.
Into a suitable vessel
40 g of conventional commercial polyester diol (such as Elastoflex ®W 5549 comp. A)
20 g of conventional, commercial isocyanate cross linker (such as comp. B, type 5534 of the Elastogran ® Co.)
are weighed, thoroughly mixed and poured onto the film to be tested. The liquid foams up after about 5 minutes and forms a foam cake. After 24 hours, the adhesion is tested manually.
1=foam tear-out, 5=no adhesion 5) Determination of the Interlocking Force of Films
This method was developed by the applicant for fine films.

| Equipment Required: | |
| --- | --- |
| 1. Heat-sealing equipment | with the possibility of producing a pressure of 5 bar, a residence time of 10 minutes and a temperature of 60° C. at the upper and lower heaters. |
| 2. Tensile testing machine | in order to determine the interlocking force on the test samples. |
| 3. Cutting knife | for preparing the samples |
| 4. Upper and lower film (Teflon ®) | for preparing sample |
| 5. Glass plate | cutting support |
| 6. Teflon strips | in order to carry out the interlocking. |

Procedure:

1. Preparing Test Sample
Sample width=15 mm
Sample length=100 mm
Two test samples with these dimensions are cut out with a cutting knife. To ensure a satisfactory cut, it is necessary to use an upper film and a lower film for monofilms.

2. Test Sample Preparation
The test samples are placed on top of one another and fixed with Teflon and two paper clips.

3. Interlocking of Test Samples
The test sample, so prepared, is interlocked for 10 minutes at a pressure of 5 bar and a temperature of 60° C. (both heating jaws). The interlocking surface of the test sample is 15 mm×10 mm.

4. Evaluating the Interlocking
After the interlocking, care must be taken to ensure that the films lie exactly one on top of the other (otherwise, falsification of the test width) and that the interlocking takes place over the whole of the area (uniform appearance). Excessive film thickness variations are a possible cause of incomplete interlocking over the whole of the area.

5. Determining the Interlocking Force
The test samples are clamped without tension in the test clamps, as in the DIN 53530 release test. The interlocking force is determined at a test speed of 100 mm/min.

6. Evaluation
The results are evaluated according to DIN 53539. The interlocking force is given in N/15 mm.

6) Determining the Release Force
To determine the release force, test samples, 15 mm wide and 100 mm long, are cut from the extruded and collapsed tube before it is separated.
Using these test samples, the release force is determined according to DIN 53530, as described above for determining the interlocking force.

|  | Example 1 | Example 2 | Example 3 | Example 4 | Comparison Example 1 |
|---|---|---|---|---|---|
| TPU | 90 parts TPU 1 | 90 parts TPU 1 | 90 parts TPU 1 | 90 parts TPU 1 | 100 parts TPU 1 |
| Polyether amide | 10 parts PEBA.40 | 10 parts PEBA.40 | 10 parts PEBA.40 | 10 parts PEBA.55 | — |
| Additive | — | — | — | — | — |
| EXTRUSION | | | | | |
| RPM | 18 rpm | 25 rpm | 35 rpm | 18 rpm | 18 rpm |
| Current Consumption | 13 A | 13 A | 14 A | 14 A | 17 A |
| Pressure Before Screen | 200 bar | 210 bar | 210 bar | 340 bar | 350 bar |
| Pressure After Screen | 130 bar | 140 bar | 140 bar | 270 bar | 290 bar |
| Composition Temperature | 196° C. | 198° C. | 198° C. | 199° C. | 200° C. |
| Film | Film is separated very easily No interlocking on winder | Film is separated very easily No interlocking on winder | Film is separated easily No interlocking on winder | Film is separated very easily No interlocking on winder | Film cannot be separated Interlocking on winder |
| Film Thickness according to DIN 53370 | 37 μm | 41 μm | 37 μm | 38 μm | Data cannot be obtained |
| Interlocking Force (N/15 mm) | 0.22 | 0.22 | 0.22 | 0.22 | |
| Release Force (N/15 mm) | 0.05 | 0.03 | 0.05 | 0.03 | |
| Ultimate Tensile Strength according to DIN 534555 (MPa) | 90 | 80 | 90 | 70 | |
| Elongation at break according to DIN 53455 (%) | 585 | 682 | 585 | 540 | |
| Stress at 100% elongation according to DIN 53455 (MPa) | 10.5 | 8.1 | 10.5 | 7.1 | |
| Resistance to tear propagation according to DIN 53515 (N/mm) | 73 | 77 | 73 | 78 | |
| Foaming Test | 1 | 1 | 1 | 1 | |

|  | Comparison Example 2 | Example 5 | Example 6 | Comparison Example 3 | Comparison Example 4 |
|---|---|---|---|---|---|
| TPU | 100 parts TPU 1 | 90 parts TPU 2 | 90 parts TPU 2 | 100 parts TPU 2 | 100 parts TPU 2 |
| Polyether amide | — | 10 parts PEBA.40 | 10 parts PEBA.55 | — | — |
| Additive | 0.1 parts wax | — | — | 0.05 parts Ca Stearte | 0.2 parts wax |
| EXTRUSION | | | | | |
| RPM | 18 rpm | 18 rpm | 18 rpm | 18 rpm | 18 rpm |
| Current Consumption | 15 A | 14 A | 15 A | 14 A | 14 A |
| Pressure Before Screen | 340 bar | 270 bar | 290 bar | 280 bar | 280 bar |
| Pressure After Screen | 280 bar | 235 bar | 240 bar | 240 bar | 230 bar |
| Composition Temperature | 199° C. | 193° C. | 194° C. | 196° C. | 195° C. |
| Film | Film can be separated No interlocking on winder | Film is separated easily No interlocking on winder | Film is separated easily No interlocking on winder | Film is difficult to separate Interlocked on winder | Film can be separated No interlocking on winder |
| Film Thickness according to DIN 53370 | 38 μm | 46 μm | 47 μm | 53 μm | 53 μm |
| Interlocking Force (N/15 mm) | 0.22 | 0.7 | 1.5 | 0.9 | 0.1 |
| Release Force (N/15 mm) | 0.04 | 0.14 | 0.17 | 0.42 | 0.1 |
| Ultimate Tensile Strength according to DIN 534555 (MPa) | 70 | 70 | 60 | 80 | 70 |
| Elongation at break according to DIN 53455 (%) | 540 | 660 | 540 | 590 | 570 |
| Stress at 100% elongation according to DIN 53455 (MPa) | 7.1 | 8.2 | 9.3 | 9.5 | 9.5 |
| Resistance to tear propagation according to DIN 53515 (N/mm) | 67 | 65 | 70 | 55 | 55 |
| Foaming Test | 5 | 1 | 1 | 1 | 1 |

We claim:

1. A film of thermoplastic polyurethane with a Shore hardness of 75 A to 92 A and having 5 to 20% by weight of polyether amide block copolymers and/or polyether ester block copolymers, based on the weight of the polyurethanes.

2. The film of claim 1, characterized in that it is obtained by single layer blown extrusion technique of the monofilm.

3. The film of claim 2, characterized in that it contains polyether amide block copolymers.

4. The film of claim 1 characterized in that it has a maximum thickness of 100 μm.

5. The film of claim 1 characterized in that the polyether amide block copolymer is based on PTMG and/or PEG.

6. The film of claim 1 characterized in that the polyether amide block copolymers are based on nylon 11, nylon 12 and/or nylon 12.12.

7. The film of claim 1 characterized in that the thermoplastic polyurethanes have a Shore hardness of 80 A to 90 A.

8. The film of claim 1 and an additional substrate.

9. The film of claim 8, wherein said additional substrate is of a polyurethane foam.

* * * * *